B. E. RICHARDSON.
CLUTCH.
APPLICATION FILED NOV. 13, 1918.

1,396,343.

Patented Nov. 8, 1921.

Inventor
Bayard E. Richardson
By Moulton & Lurance
Attorneys.

UNITED STATES PATENT OFFICE.

BAYARD E. RICHARDSON, OF GRAND RAPIDS, MICHIGAN, ASSIGNOR TO MECHANO GEAR SHIFT CO., OF GRAND RAPIDS, MICHIGAN, A CORPORATION OF MICHIGAN.

CLUTCH.

1,396,343.      Specification of Letters Patent.      Patented Nov. 8, 1921.

Application filed November 13, 1918. Serial No. 262,383.

*To all whom it may concern:*

Be it known that I, BAYARD E. RICHARDSON, a citizen of the United States of America, residing at Grand Rapids, in the county of Kent and State of Michigan, have invented certain new and useful Improvements in Clutches; and I do hereby declare the following to be a full, clear, and exact description of the invention, such as will enable others skilled in the art to which it appertains to make and use the same.

This invention relates to a clutch of the over-running type. It is a primary object and purpose of the invention to provide a positive and quick action clutch operable to positively connect driving and driven shafts when the driving shaft is turning in one direction but which, when the driven shaft through any cause exceeds the speed of the driving shaft, operates so that the two are disconnected, the driven shaft overrunning the driving shaft without affecting its movement. A clutch of this type is useful in many mechanisms as, for instance, in electric self-starter constructions, punch presses or transmission gearings, as well as many other mechanisms containing driving and driven shafts. A further object of the invention is to produce a clutch of this character including very few easily produced and machined parts, thereby reducing the cost of production to a minimum, and also one in which all springs are eliminated and a locking means between the two shafts used which is positively forced into place without dependence upon any spring pressure of any kind which, in many instances, is more or less defective, particularly in cold weather when lubricant becomes of a stiff and viscous character interfering with the action of springs. All of these features, together with many others, will appear as understanding of the invention is had from the accompanying drawing, in which—

Like reference characters refer to like parts in the different views of the drawing.

Figure 2:
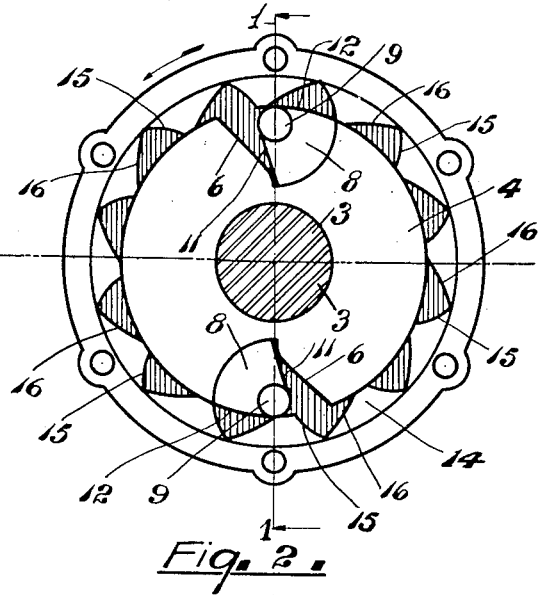
Figs. 2 and 3 are partial section and end elevations, looking against the right hand end of Fig. 1 with the cover plate and adjacent inner plate removed to disclose the structure, the position of the parts in the two figures indicating the non-driving and driving relations of the parts, respectively.
Figure 4:
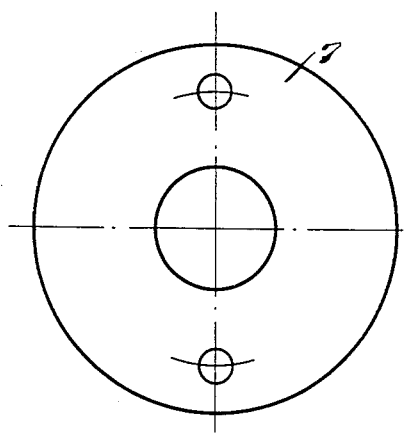
Fig. 4 is an elevation of one of the inner plates used in the construction of the clutch.
Figure 3:
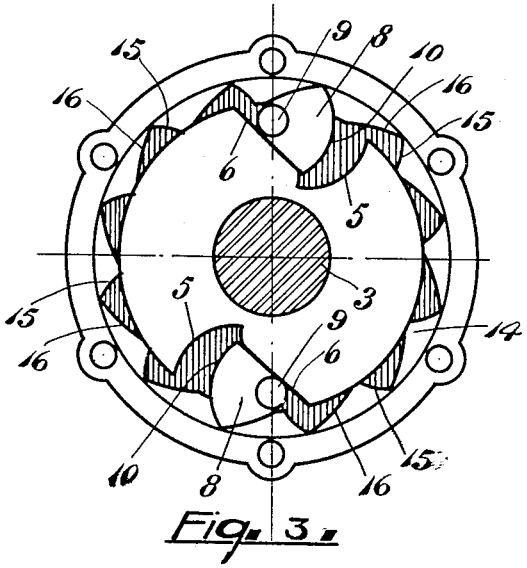

In construction a shaft 1 is used having an annular flange 2. In alinement with shaft 1 is a second shaft 3 having a circular head 4 of less diameter than the diameter of the flange 2, but of greater thickness. In opposed sides of the head 4, notches of the form shown are cut, the notches being provided each with a side 5 struck in the arc of a circle and a second inclined side 6, the inner end of the side 6 curving inwardly to meet the inner end of the arc-shaped side 5 as shown in Figs. 2 and 3.

Figure 1:
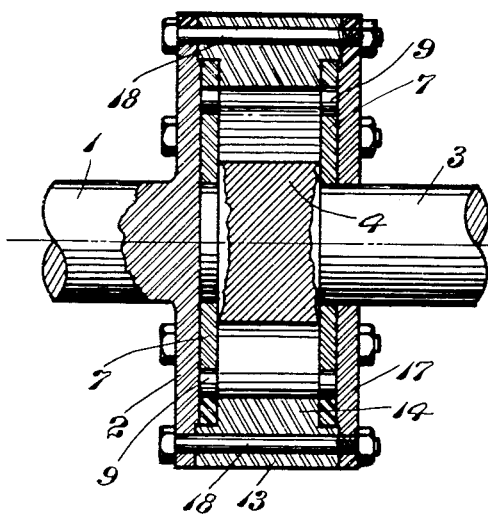
Figure 1 is a vertical section taken substantially on the line 1—1 of Fig. 2.

On each side of the head 4 a plate 7 is located and between the two plates two keys 8 are positioned, being pivotally carried by and between the plates. Studs 9 project from each key through suitable openings in the plates, as indicated in Fig. 1. Said keys 8 are of special formation, having three sides 10, 11 and 12, the first of which have the same radius of curvature as the arc-shaped side 5 of the slots heretofore referred to and struck about the axis of the pivotal studs 9 as a center. The second side 11 of each key is flat and inclined so as to bear against the inclined side 6 of a notch in head 4, while the remaining side 12 is of curved form having a radius of curvature the same as that of the head 4 so that when the keys are received entirely within the notches, the outer sides 12 of said keys, in effect, form a continuation of the outer surface of the head 4, as shown in Fig. 2.

A housing ring 13, of a width slightly greater than the combined widths of the head 4 and the two plates 7 is provided, it having an inwardly extending annular tongue 14 passing between the outer edges of the plates 7. In the tongue a series of notches are cut in succession entirely around the same, each notch having two curved sides 15 and 16, the former of which has a radius of curvature the same as a side 10 of a key 8 or of the side 5 of the notches in head 4, while the latter has a radius of curvature identical with that of the outer side 12 of a key.

In assembling the construction, a plate 7 is placed against the flange 2 and the housing ring 13 then positioned against the flange 2 and said plate 7, after which the head 4 on the shaft 3 may be inserted into the housing ring 13. The keys 8 are then entered into the notches in said head with studs 9 passing through the proper openings in said plate 7, after which the second plate 7 is placed in position so as to receive the opposite studs 9, the assembly being completed by a cover plate 17 which is held in place, together with the remainder of the construction, by a plurality of bolts 18 passing through the flange 2, the housing ring 13, and the outer cover plate 17, receiving suitable nuts as shown. When thus assembled, the plates 7 are snugly but not too tightly positioned between the head 4 and the flange 2 and cover plate 17 and likewise the width of the tongue 14 is the same as the thickness of the head 4 whereby said plates 7 are not positively connected in any way to the housing members of the clutch.

In operation, supposing shaft 1 to be the driving shaft just starting to rotate in the direction indicated by the arrow in Fig. 2, immediately, through the friction exerted by the flange 2, housing ring 13 and cover plate 17 against the inner plates 7, there is a tendency for them to move with the shaft and attached parts. This moves the keys 8 so that sides 11 of the two keys are brought into contact with the sides 6 of the notches in head 4 and the keys drawn outward into notches in tongue 14, as shown in Fig. 3, the sides 10 and 12 of the keys conforming to the sides 15 and 16 of the notches in which they seat. This action occurs almost instantly. If one notch is passed by a key, it is received by the next notch, whereupon there is a positive driving connection established between the two shafts. The shaft 3 may drive any suitable mechanism, say for instance, the fly wheel of an internal combustion engine in the operation of starting the same. As soon as the engine starts, shaft 3 will be driven by the engine faster than it has been driven by shaft 1, whereupon the head 4 moving faster than the housing ring 13 and frictionally dragging the plates 7 and attached keys with it, draws the keys against the downwardly projecting portions of tongue 14 between the notches, whereupon they seat completely within the notches in head 4 permitting the head to ride free without in any way affecting the rotation of shaft 1 except through the relatively slight friction between the plates 7 and the outer covering members of the clutch. This is one adaptation of the clutch and place in which it is of utility, though it is of course understood that many other applications of the same may be made, such as on punch presses, in transmission gearings and the like.

While I have denoted shaft 1 as the driving shaft and 3 the driven shaft, it is not necessary that this relation of the parts shall be followed, as shaft 3 can with equal utility be the driving shaft and shaft 1 the driven shaft, though the direction of rotation must be opposite from that indicated by the arrow in Fig. 2.

The construction is very simple, compact, strong and durable, and in practice has proven absolutely reliable and efficient, working instantaneously as soon as the driving shaft is started to connect the driving and driven shafts together, and operating with equal facility to disconnect the shafts when the so-called driven shaft, through other forces, is driven faster than the driving shaft is rotated. Springs and like throw-out devices are entirely eliminated, and the keys are of such form and operate in notches in such manner that no crushing or shearing strain is placed on any part thereof liable to give way.

I claim:

1. In combination, two shafts located in alinement, a housing fixed at one end of one of said shafts, a cylindrical head fixed to the adjacent end of the other shaft and located within the housing, said head being provided with a notch in a side thereof, plates located one at each side of the head, a key pivotally mounted on and between the plates and adapted to be wholly received within the notch in said head, the outer side of said key having the same radius of curvature as the head so as to aline therewith when in the notch, and a tongue projecting inwardly from the housing and provided with a series of notches, any one of which may partially receive the key, substantially as described.

2. In combination, two shafts located in alinement, a cylindrical housing fixed at one end of one of said shafts, a cylindrical head fixed to the adjacent end of the other shaft and located within the housing, said head being provided with notches in opposed sides thereof, two plates located one at each side of the head within the housing, keys pivotally mounted on and between the plates and adapted to seat wholly within the notches in the head with the outer sides of the keys having the same radius of curvature as the curved surface of the head, and an annular tongue projecting inwardly from the housing to closely adjacent the curved surface of said head, said tongue being provided with a consecutive series of notches into any one of which a key may partially enter and seat, substantially as described.

3. In combination, a hollow cylindrical housing adapted to be rotated, a shaft, an enlarged cylindrical head on the end of the shaft located within the housing, said head being provided with a notch in one side thereof, having one side of circular outline and another side of flat form inclined away from the inner part of the circular side to the outer surface of the head, a plate positioned each side of the head, a key pivotally mounted on and disposed between the plates, and adapted to seat wholly within the notch, said key having its side farthest away from its pivot curved in the arc of a circle the center of which is the pivotal axis of the key and of the same curvature as the curved side of the notch, and having its outer side curved with the same radius of curvature as that of the head, while its inner side is inclined to bear against the inclined side of the notch in one position of the key, and a tongue projecting inwardly from the housing and provided with a consecutive series of notches having curved sides to partially receive the curved sides of the key when the inclined side of the key is bearing against the inclined side of the notch, substantially as described.

In testimony whereof I affix my signature.

BAYARD E. RICHARDSON.